No. 684,832. Patented Oct. 22, 1901.
G. F. LEIGER.
CAN TESTING MACHINE.
(Application filed Apr. 17, 1901.)

(No Model.) 8 Sheets—Sheet 1.

Fig. 1.

Witnesses:
Inventor:
George F. Leiger
by Bond, Adams, Pickard & Jackson
Atty's.

No. 684,832. Patented Oct. 22, 1901.
G. F. LEIGER.
CAN TESTING MACHINE.
(Application filed Apr. 17, 1901.)
(No Model.) 8 Sheets—Sheet 4.

Witnesses: Inventor:

No. 684,832. Patented Oct. 22, 1901.
G. F. LEIGER.
CAN TESTING MACHINE.
(Application filed Apr. 17, 1901.)
(No Model.)
8 Sheets—Sheet 5.

Witnesses:
Inventor:
George F. Leiger

No. 684,832. Patented Oct. 22, 1901.
G. F. LEIGER.
CAN TESTING MACHINE.
(Application filed Apr. 17, 1901.)
(No Model.) 8 Sheets—Sheet 6.

Witnesses:
Inventor:
George F. Leiger

No. 684,832.  
G. F. LEIGER.  
CAN TESTING MACHINE.  
(Application filed Apr. 17, 1901.)

(No Model.)

Patented Oct. 22, 1901.

Witnesses:
G. H. Glendening
H. S. Gaither

Inventor:
Geo. F. Leiger
By Bond, Adams, Pickard & Jackson
Attys.

THE NORRIS PETERS CO., PHOTO-LITHO., WASHINGTON, D. C.

No. 684,832. Patented Oct. 22, 1901.
G. F. LEIGER.
CAN TESTING MACHINE.
(Application filed Apr. 17, 1901.)
(No Model.) 8 Sheets—Sheet 8.

Witnesses: Inventor:

UNITED STATES PATENT OFFICE.

GEORGE F. LEIGER, OF CHICAGO, ILLINOIS, ASSIGNOR TO HIMSELF AND LEWIS BENEDICT, OF SAME PLACE.

CAN-TESTING MACHINE.

SPECIFICATION forming part of Letters Patent No. 684,832, dated October 22, 1901.

Application filed April 17, 1901. Serial No. 56,280. (No model.)

*To all whom it may concern:*

Be it known that I, GEORGE F. LEIGER, a citizen of the United States, residing at Chicago, in the county of Cook and State of Illinois, have invented certain new and useful Improvements in Can-Testing Machines, of which the following is a specification, reference being had to the accompanying drawings.

My invention relates to can-testing machines; and its object is to provide a new and useful machine which may receive cans which are to be tested for leaks and by appropriate mechanism separate the cans which are leaky from the cans which are perfect, discharging the leaky cans at one point and the perfect cans at another. It is well known that in order to insure the perfect preservation of the material to be canned the can containing it should be perfectly sound and free from any openings or leaks which might permit the entrance of air to the contained substance. By the mechanism hereinafter described I provide a machine which will automatically take the cans one after the other as they are fed to it and automatically separate from the rest and discharge any can which has a leak in it, no matter how small, discharging the cans which are entirely free from leaks at another point. To that end the mechanism embodying my invention in the form shown and described herein, generally described, is as follows: A rotating wheel partially immersed in and rotating through a water-tank is provided with a number of can engaging and carrying devices, which by the rotation of the wheel automatically act to successively grasp cans fed to the wheel and carry them around through the water in the water-tank. A suitable source of compressed-air supply is connected with the wheel and with the can-engaging mechanism. By suitable devices operated by the rotation of the wheel compressed air is led from the source of supply to the cans as the wheel rotates, so that they are filled with air under pressure while submerged in the water in the tank. A number of floats or similar devices are mounted upon the wheel and are so located with reference to the can-carrying devices that when the can passes through the water the float or similar device will be in position to receive and be operated by any air which may escape from a leaky can and moved from its normal position by the escape of the compressed air. A lever connected with each float is so arranged as to be moved from its normal position by the moving of the float from its normal position. Mechanism suitably arranged is provided whereby when the float or similar device is moved from its normal position by the escape of air from a leaky can the mechanism will be operated to automatically discharge the can from the can engaging and carrying devices at a certain point of the revolution of the wheel. When the float or similar device is not moved from its normal position—that is to say, when the can has no leak whatever—the first can-discharging mechanism is not operated and the perfect cans are carried on by the wheel until other mechanism is reached, which by the rotation of the wheel is automatically operated to discharge each can not previously discharged—that is to say, the perfect cans—at another point in the rotation of the wheel.

One of the principal objects of my invention, therefore, is to provide a device which is moved from its normal position by the escape of air from a leaky can and suitable mechanism operated by such device when so moved from its normal position to automatically discharge the leaky can from the machine. By this mechanism and by my inventions embodied in the same I have devised a machine which does away with the necessity for any attendance, so far as the separation of leaky and imperfect cans from perfect cans is concerned, and it operates in said respects entirely automatically.

Another object of my invention is to improve automatic can-testing machines in sundry details hereinafter pointed out.

That which I regard as my invention is set forth in the claims.

In the accompanying drawings.

Figure 3:
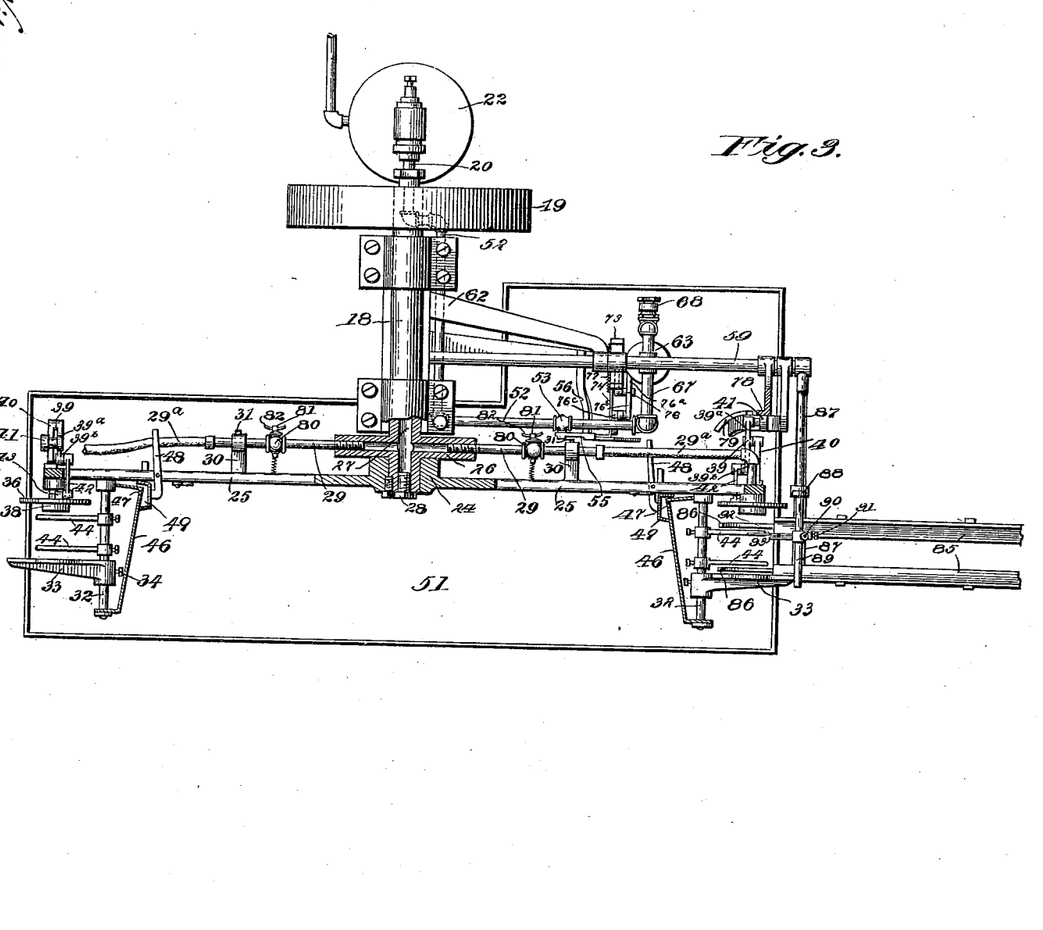
Fig. 3 is a section on line 3 3 of Fig. 2.
Figure 4:
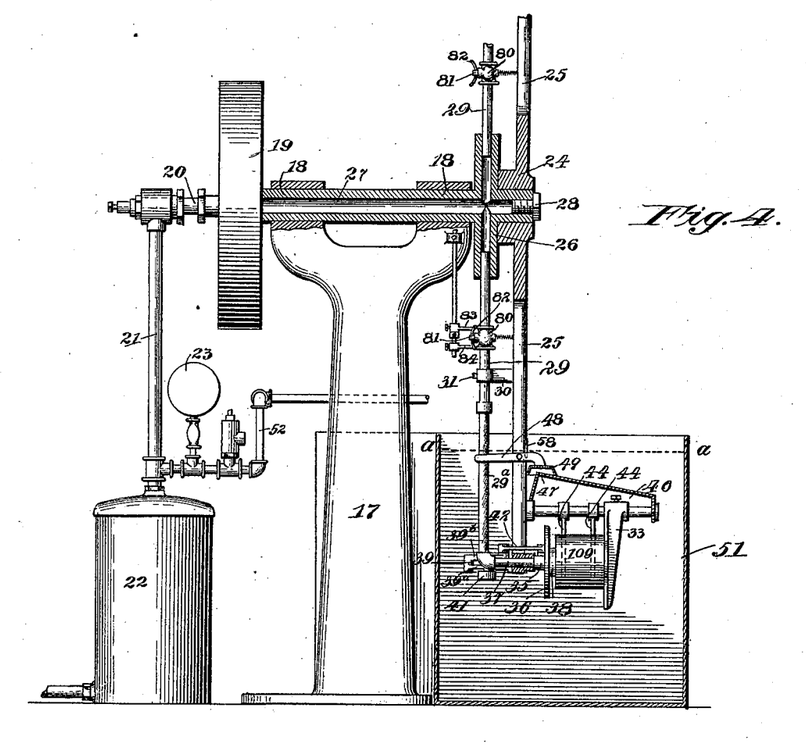
Fig. 4 is a section on line 4 4 of Fig. 1.

Referring to the drawings, 17 indicates a standard, on the upper end of which is journaled an axle 18, which is driven through a a driving-pulley 19 by any suitable source of power. The axle 18 is hollow, as is best shown in Figs. 3 and 4, and is connected by piping 20 21 with an air-reservoir 22, which contains a supply of compressed air. The air in the reservoir 22 is maintained at the proper pressure (indicated by gage 23) by any suitable pump (not shown) or any other appropriate mechanism. Upon the axle 18 is keyed or otherwise secured a wheel 24, provided with a number of spokes 25. The spokes 25 support the can engaging and discharging devices hereinafter described. As the spokes and the devices which they support and carry around by the rotation of the wheel are all alike, a description of one will serve for a description of all.

26 indicates a hub which is formed integral with, keyed to, or in any suitable manner secured to the axle 18. The hub 26 opens into the opening 27 in the axle 18, so as to communicate by means of the pipes 20 21 with the air-reservoir 22, and is provided upon its periphery with a number of openings, the same as the number of spokes 25, registering therewith and opening into the open portion 27 of the axle 18. The end of the axle 18 which is on the opposite side of the machine from the reservoir 22 is closed by a suitable plug 28.

29 indicates a tube which is supported by a support 30, secured to the spoke 25 and secured thereon by a set-screw 31, as is best shown in Fig. 3.

32 indicates a pin which is secured upon one side of the spoke 25, near the outer end, and projects at right angles therefrom.

33 indicates an arm through a suitable opening in one end of which the pin 32 passes and which is secured to the pin 32 by a set-screw 34, so as to be adjustably mounted thereon longitudinally of said pin 32.

Figure 7:
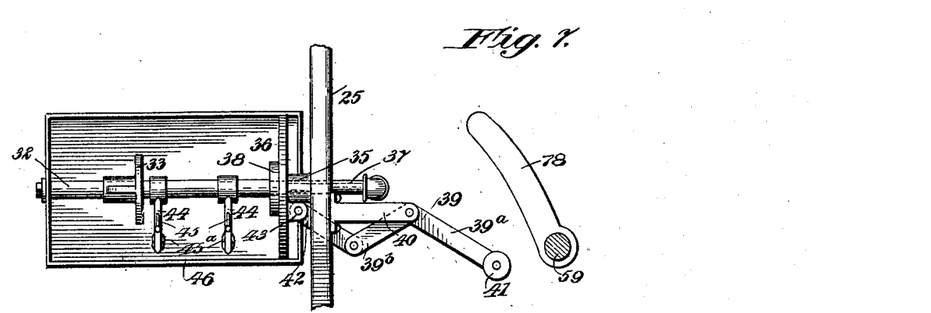
Fig. 7 is an enlarged detail of the can-engaging mechanism at a point just before the can is engaged.
Figure 8:
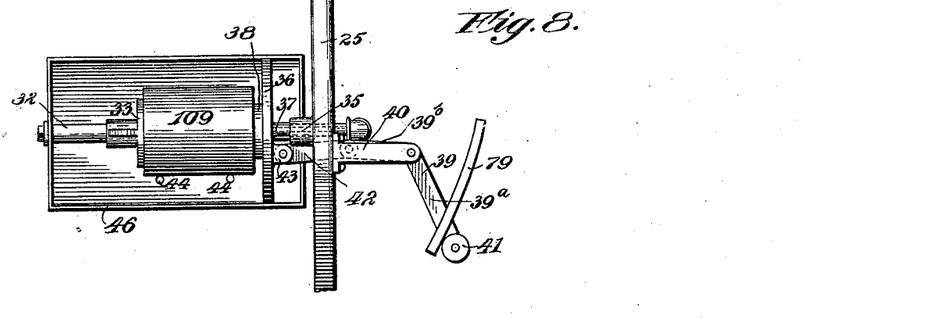
Fig. 8 is an enlarged detail, being a view of the can-engaging mechanism shown in a position just before the opening of the parts to discharge the can.
Figure 9:
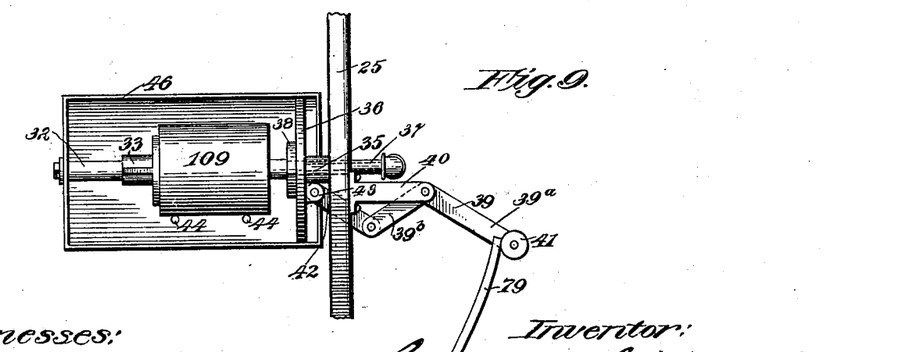
Fig. 9 is an enlarged detail, being a view of the same parts shown in Fig. 8, showing the can-engaging mechanism fully opened to permit the discharge of the can.

Referring to Figs. 7, 8, and 9, where these devices next to be described are best shown, 35 indicates a boss which is formed on the spoke 25, near its outer end. The boss 35 is provided with a suitable opening which passes through it and through the spoke 25. 36 indicates a plate which is centrally secured to a tube 37. The tube 37 passes through the opening in the boss 35 and spoke 25, so as to slide to and fro therein. The other end of the tube 37 is connected with the pipe 29 by means of a flexible tube 29ª, and the opening in the tube 37 registers with an opening through the plate 36. 38 indicates a washer which is secured to the plate 36 upon the opposite side from the pipe 37 and is provided with an opening registering with the opening in the pipe 37 and the opening in the plate 36, as is indicated by dotted lines in Figs. 7, 8, and 9. 39 indicates a bell-crank lever which is pivoted to a suitable support 40, mounted upon the spoke 25. The arm 39ª of the bell-crank lever 39 is provided at its outer or free end with a roller 41, journaled thereon and adapted to engage the several cam-tracks hereinafter described. The other arm 39ᵇ of the bell-crank lever 39 is pivoted at its end to a link 42, the other end of which is pivotally connected to a lug 43 upon the plate 36, whereby the arm 39ᵇ and the link 42 form a toggle-joint lever. By the swinging of the bell-crank lever 39 by the operation of the devices hereinafter described the plate 36 is moved toward or away from the arm 33. 44 indicates rods, which are adjustably secured to the pin 32 by means of suitable set-screws, as is best shown in Figs. 3 and 4. The rods 44 are bent, as is best shown in Fig. 2.

Figure 2:
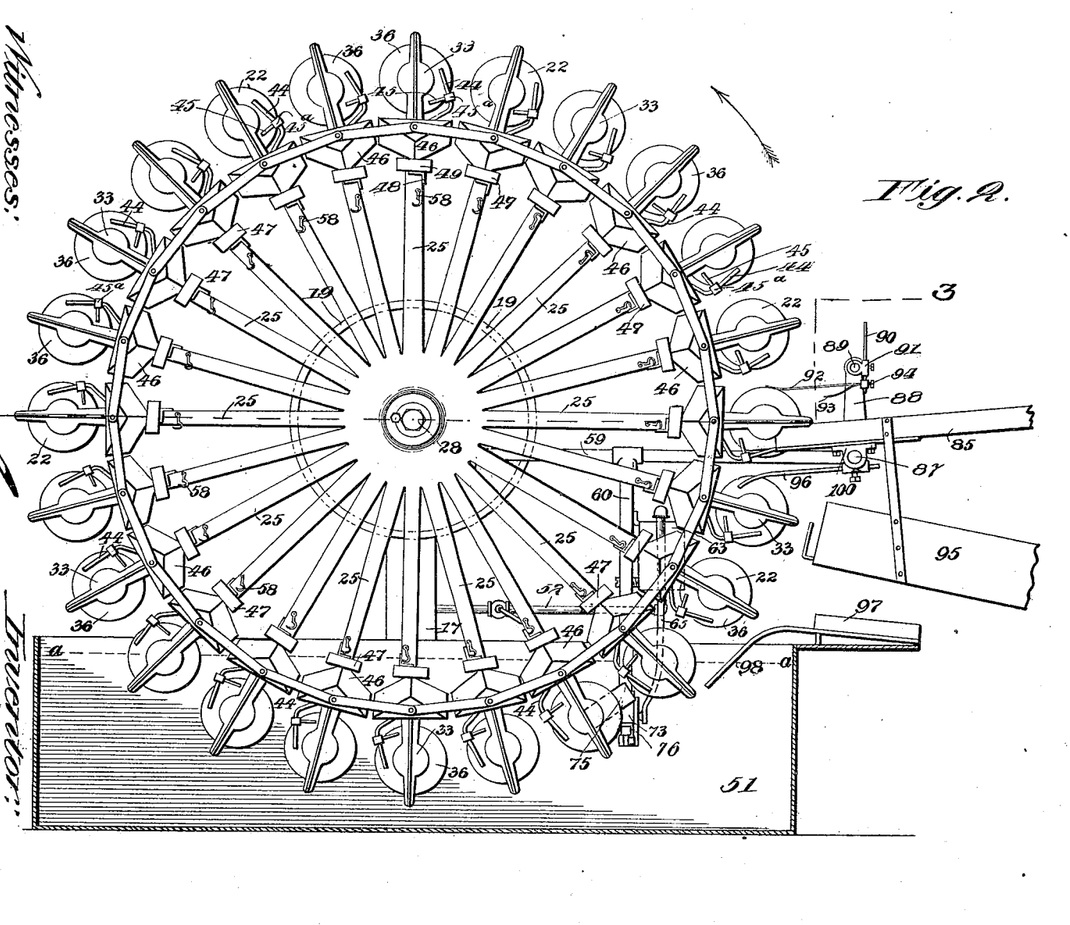
Fig. 2 is a side elevation viewed from the opposite side from Fig. 1, also showing some of the parts in section.
Figure 5:
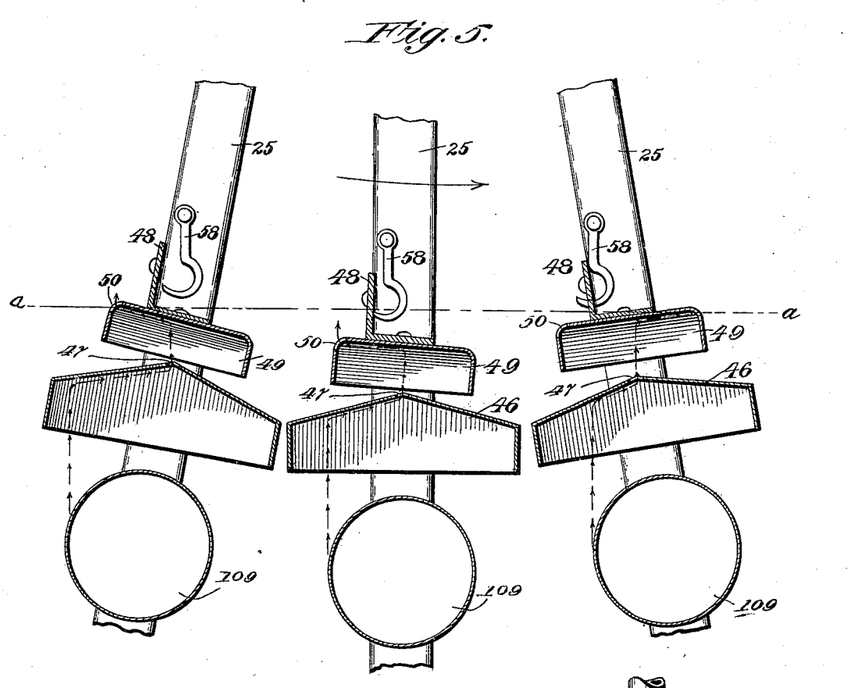
Fig. 5 is an enlarged detail showing the cans and the accompanying floats in different positions during the discharge of the can through the water-bath.

Referring to Fig. 2, 45 indicates pins which are screwed into collars 45ª. The collars 45ª are mounted upon the rods 44 and are set in place by screwing in the pins 45 to bear against the rods 44, whereby the pins 45 may be moved forward or back upon the rods 44 and set in any desired position. 46 indicates a deflector, the form of which is best shown in Figs. 3 and 5, the said deflector being shown in longitudinal cross-section in Fig. 3 and in transverse cross-section in Fig 5. As shown in said figures, the deflector 46 is of a box form, open at the side next to the pin 32 and having its upper surface in cross-section somewhat roof-shaped, as is best shown in Fig. 5, and sloping away from the pin 32, from the outer end of said pin toward its inner end, as is best shown in Fig. 3, so that when the spoke carrying the deflector 46 is in a vertical position, with the deflector at its lower end, the point of the deflector opposite and near the center of the spoke will be highest. The deflector 46 is provided with an opening 47, which is located, as is best shown in Figs. 3 and 5, centrally and at a point near the spoke 25, whereby when the spoke is in a vertical position, with the deflector at its lower end, the opening 47 will be at the highest point of the deflector. It is obvious that this construction may be varied in detail, the essential feature being that the surface of the deflector shall slope when in the position above described upward toward the float hereinafter described, so that any air which may escape from a defective can, as hereinafter described, may be directed under the float as the same reaches its operative position.

48 indicates a lever which is pivoted upon the spoke 25 and extends across the same. The arm of the lever 48 which is upon the side of the spoke upon which the deflector and can-engaging devices are mounted carries a float 49, which is of box form, open below, and is provided at one end, as is best shown in Fig. 5, with an opening 50 to permit the escape of air from the float while the same is entering the water, as hereinafter described, so that the air-pressure from below may not cause the end of the lever containing the float to rise when the float enters the water, as hereinafter described. The float is preferably of celluloid or some similar light material and the lever 48, with the float, is so balanced that as long as no air enters the float from below the end of the lever containing the float will remain in its lower position, the lever being in the position shown in solid lines in Fig. 6, during the entire passage of the float through the water; but, on the other hand, if the slightest quantity of air enters the float from below after the same is completely immersed in the water the pressure of the air will cause the float to rise, throwing the lever into the position shown in dotted lines in Fig. 6.

51 indicates a tank located below the wheel and adapted to contain a sufficient amount of water, so that the lower ends of the spokes, with the can engaging and holding mechanism, the deflectors, and floats, may pass entirely below the surface of the water as the wheel revolves.

Referring to Figs. 3 and 4, 52 indicates a pipe leading from the pipe 21, which opens into the air-reservoir 22 and extending above the tank 51 near the pipes 29, as is best shown in Fig. 3.

Figure 1:
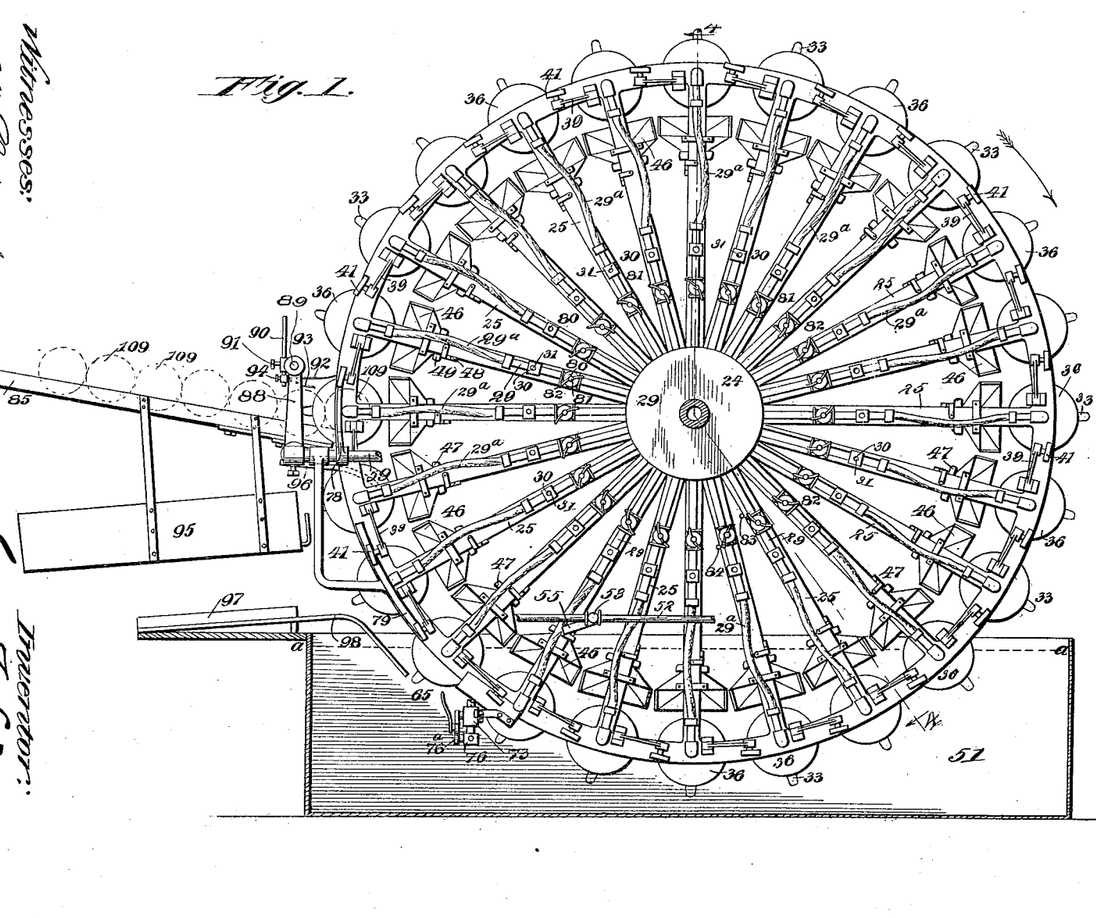
Figure 1 is a side elevation of some of the parts in vertical section.
Figure 6:
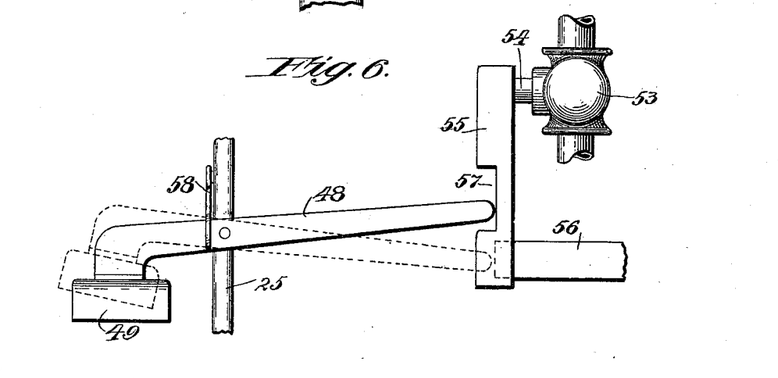
Fig. 6 is an enlarged detail, being a side view of the float and lever and a view of the valve-opening devices operated thereby.

Referring to Figs. 3 and 6, 53 indicates a plug-valve of ordinary form and construction, the turning of which will open or close the passage through the pipe 52. 54 indicates the valve-stem of such valve. 55 indicates an arm which is secured to the end of the valve-stem 54 and depends when said valve is closed diagonally downward and to the left, as is best shown in Fig. 1. The weight of the arm 55 is such as to cause the same to fall by its own weight and keep the valve 53 normally closed, being prevented from dropping too far by a stop (see Figs. 3 and 6) which is secured to the framework of the machine and engages the end of the arm 55 in its lowest position. The surface of the arm 55 upon the side toward the spokes 25 is cut away, forming a recess 57, as is best shown in Fig. 6.

When the floats are not raised, as hereinafter described, the lever 48 is in the position shown in Fig. 6, and as the wheel rotates the end of the lever 48 registers with the recess 57 and passes clear of the arm 55. When the floats are lifted by the escape of air from a can, as hereinafter described, the lever 48 is in the position shown in dotted lines in Fig. 6, with the end of the lever beyond the recess 57 and in position as the wheel rotates to engage with the end of the arm 55, so as to lift the said arm and open the valve 53, permitting the passage of air from the reservoir 22 through the valve. The lever 48 is held in the position shown in dotted lines in Fig. 6 when moved into such position by the raising of the float by means of a hook 58, which is pivotally hung upon the side of the spoke 25 on the side facing the float 49. The hook 58 swings freely upon its pivot, so that when the float is raised and the wheel is rotating in the direction shown by the arrow in Fig. 5 when the spoke 25 passes forward of its vertical position the hook 58 swings under the arm of the lever 48 upon which the float is mounted, thus locking it in its raised position and insuring the moving of the arm 55 and the opening of the valve 53. It is obvious that when the wheel has rotated somewhat over half a revolution from the position last described the hook 58 will drop out of engagement with the arm and permit the end of the lever containing the float to drop to its normal position, as is shown in Fig. 5.

59 60 61 (see especially Figs. 3 and 11) indicate framework which is supported by an arm 62, carried upon the base or pedestal of the machine 17.

63 (see Figs. 3, 10, and 11) indicates a cylinder which is mounted upon the framework 60 and contains a piston 64, (indicated by dotted lines in Figs. 10 and 11,) to which is secured a piston-rod 65. The cylinder 63 is open below, but opens above by a suitable connection 66 into the pipe 52, so that when the valve 53 is opened, as above described, compressed air passes from the reservoir 22 above the piston 64, forcing the same downward.

67 (see Fig. 10) indicates a pipe which opens into the pipe 52 above the cylinder and is provided at its other end with an ordinary gate-valve 68.

69 indicates the stem of the gate-valve, to which is secured two lugs 70 71.

Figures 10, 12:
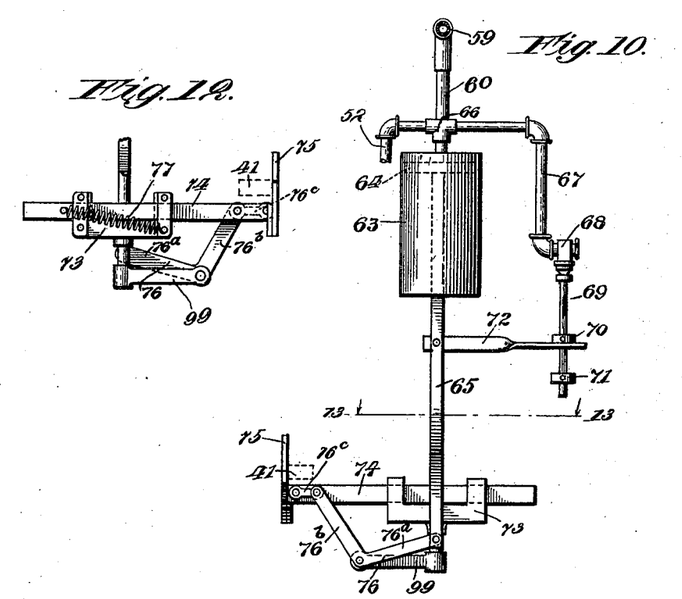
Fig. 10 is an enlarged detail, being an end view from the right in Fig. 2 of the devices operating to open the can-engaging mechanism to discharge an imperfect can.
Fig. 12 is an enlarged detail, being a view of the bottom portion of the parts shown in Fig. 10 seen from the other side.

72 indicates an arm which is secured at one end to the piston-rod 65 and has at its other end an opening through which the valve-stem 69 passes, so that the arm 72 may with the movement of the piston slide freely on said valve-stem, but may engage the two lugs or heads 70 71. The end of the pipe 67 beyond the gate-valve opens to the air, as is best shown in Fig. 10, whereby when the gate-valve 68 is open the compressed air above the piston may escape into the atmosphere and restore normal atmospheric pressure above the piston. When the piston descends by the pressure of the compressed air above it, the arm 72 is carried downward, sliding over the valve-stem 69 until it engages with the lug or head 71, which causes the stem 69 of the gate-valve 68 to be moved downward, opening the gate-valve 68, which, as was said above, allows the escape of the compressed air above the piston into the atmosphere and restores normal pressure above it.

Figures 11, 13:
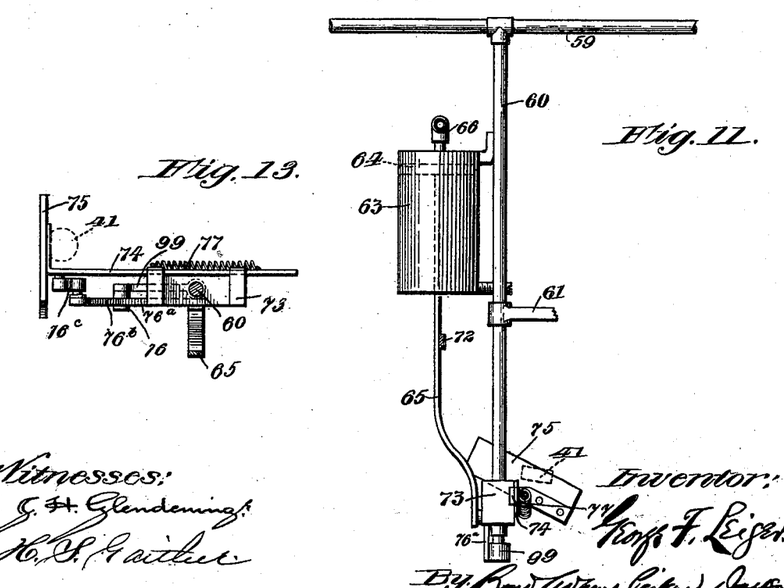
Fig. 11 is an enlarged detail, being a side view of the same devices shown in Fig. 10.
Fig. 13 is a cross-section on line 13 13 of Fig. 10.

73 indicates a slide-box which is mounted upon the frame 60, as is best shown in Figs. 10 and 11. The piston-rod 65 is bent inward toward the slide-box 73, as is best shown in Fig. 11.

74 indicates a bar which slides longitudinally in the slide-box 73 and carries upon one end a plate 75.

76 indicates a bell-crank lever which is pivoted to a suitable support 99, as is best shown in Fig. 10. The arm 76ª of the bell-crank lever 76 is pivotally connected with the lower end of the piston-rod 65, and the arm 76ᵇ is pivotally connected with the sliding bar 74 by means of a link 76ᶜ.

77 (see Figs. 12 and 13) indicates a spiral contraction-spring one end of which is secured to the slide-box 73 and the other end to the sliding bar 74. When the piston 64 is moved downward by the admission of compressed air above it, the bell-crank lever 76 is operated and the arm 74 is moved to the right in Figs. 10 and 13 and to the left in Fig. 12, carrying the plate 75 inward toward the piston-rod against the action of the spring. When the piston has moved down a suitable distance, the arm 72 engages with the lug or head 71 on the valve-stem 69, opens the gate-valve 68, and allows the escape of the compressed air above the piston. Normal atmospheric pressure above the piston being thus restored, the spring 77 operates to return the sliding bar 74 to its former position, throwing the piston upward to its original position. As the piston rises the rod 72 engages the lug or head 70, closing the gate-valve 68 for the next operation of the piston. As was said above, air is admitted above the piston when the end of the lever 48 contacts with the arm 55, so as to open the valve 53. As soon as the lever 48, carried by the rotation of the wheel, clears the arm 55 the arm 55, as was said above, by its own weight drops to its normal position, closing the valve 53.

The plate 75 is so located that when it is moved inward toward the piston-rod 65, as above described, it will contact with the roller 41 upon the bell-crank lever 39 as the same rotates, moving the same to the right in Figs. 10 and 13 and operating the cam-lever 39, so as to move the plate 36 inward toward the spoke 25 against the boss 35 in the manner and for the purpose hereinafter described.

Figure 17:
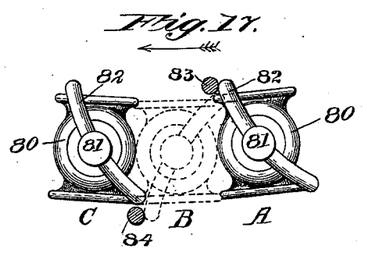
Fig. 17 is an enlarged detail, being a view of the valve by which air is admitted to the cans and showing the valve in different positions as the same is opened and closed.

Referring particularly to Figs. 1, 3, 7, 8, and 9, 78 and 79 indicate cam-tracks which are mounted upon the framework 59 and adapted to engage the roller 41 as the wheel rotates and respectively operate the bell-crank lever 39 to move the plate 36 inward toward the spoke 25 or move it outward away from the spoke 25, as hereinafter described. 80 indicates a plug-valve which is located in the pipe 29 and is provided with a valve-stem 81. The valve-stem 81 (see Fig. 17) is provided with a pin 82, which extends substantially at right angles with the stem, upon each side thereof. 83 84 indicate pins which are mounted upon the framework of the machine and are adapted to successively contact the opposite ends of the pin 82 as the wheel rotates. As the wheel rotates in the direction shown by the arrow in Fig. 17 the end of the pin 82 which is toward the center of the wheel being in the position shown at A in Fig. 17 contacts with the pin 83, and as the wheel rotates the pin 82 is turned into the position shown at B in said Fig. 17, causing the valve 80 to be opened and permitting the compressed air from the reservoir 22 to pass through the valve 80 and flexible tube 29ª and through the plate 36. The wheel continuing to rotate, the end of the pin 82 which is away from the center of the wheel contacts the pin 84, causing the pin to be swung into the position shown at C in Fig. 17, closing the valve 80.

Figures 15, 16:
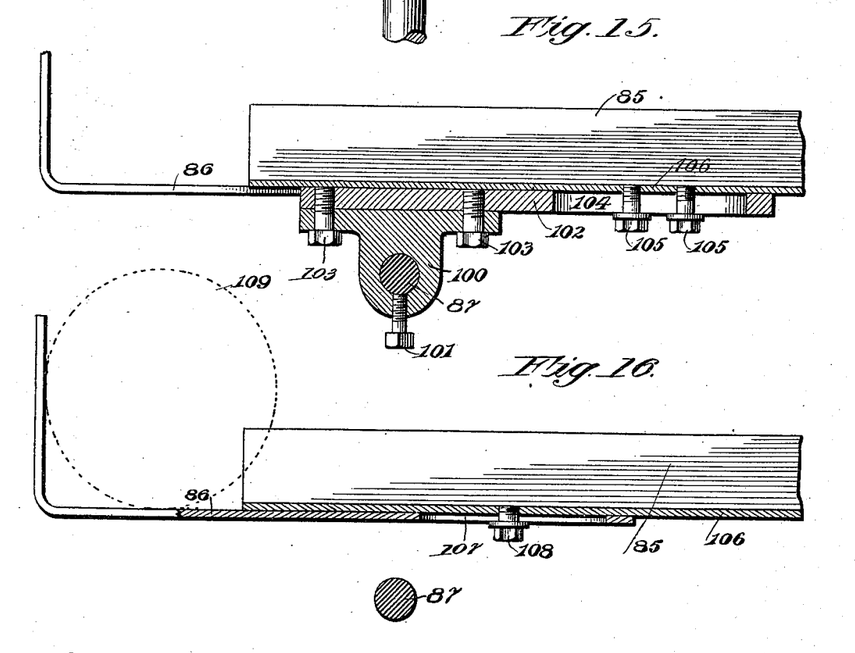
Fig. 15 is an enlarged detail, being a section on line 15 15 of Fig. 14.
Fig. 16 is an enlarged detail, being a section on line 16 16 of Fig. 14.

Referring particularly to Figs. 1, 2, and 3, 85 indicates an inclined track or chute facing the periphery of the wheel, upon which cans may be placed and on which they will move by gravity toward the periphery of the wheel. The end of the track toward the periphery of the wheel, as is shown in Figs. 15 and 16, is provided with arms 86, extending forward from its bottom and bent upward, as is shown in Figs. 15 and 16, at their forward ends near the periphery of the wheel, so that a can rolling down the said chute 85 is retained against the bent ends of the arms 86, as is shown in Figs. 15 and 16, until lifted therefrom by the rods 44, as hereinafter described. The arms 86 are separated, so as to permit the passage between them of the rods 44 as the wheel rotates, as is best shown in Fig. 3. 87 indicates a rod extending out from the framework 59 and carrying an upright 88. (See Fig. 1.) 89 indicates a rod which is carried by the upper end of the upright 88 and extends out over the chute 85. 90 indicates a pin which is adjustably secured to the rod 89 by means of a set-screw 91. 92 93 indicate spring-plates which are adjustably secured to the lower end of the rod 90 by a set-screw 94. 95 indicates an inclined chute, which is mounted below the chute 85 and is open at the end toward the periphery of the wheel and inclines downward away from the wheel. 96 indicates an arm which is mounted below the lower end of the chute 85 and extends inward and downward toward the center of the wheel, so as to pass between the rods 44 when the wheel rotates, so as to insure the throwing of the can away from the wheel when it reaches that point. 97 indicates a chute below the chute 95, sloping downward away from the periphery of the wheel and provided at its end with a plate 98, which extends inward toward the periphery of the wheel and downward, as is best shown in Fig. 1, so as to prevent the floating out of the bad cans before they reach the chute 97 when free from the wheel, as hereinafter described.

Figure 14:
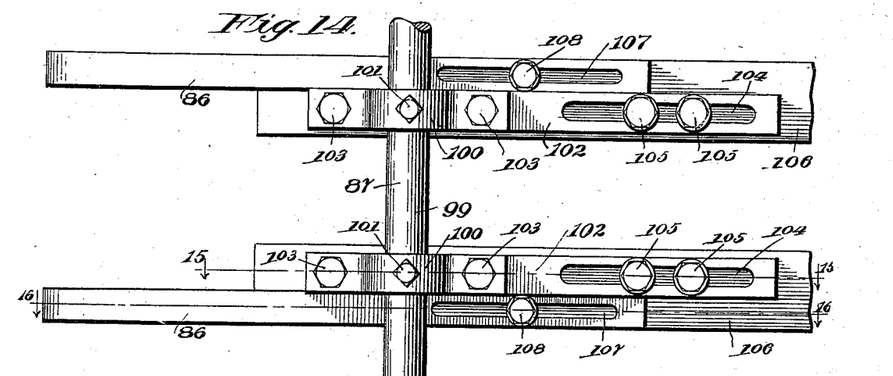
Fig. 14 is an enlarged detail, being a bottom view of the end of the track along which the cans run into the machine.

As was said above, the rods 44 are adjustable on the shaft 32, and the pins 45 are also adjustable on the rods 44 in order to insure the centering of the can when it is delivered upon the plate 36. As was said above also, the arm 33 is adjustable longitudinally of the pin 32 in order to receive cans of different lengths, and the rods 44 are also adjustable on the pin 32 in order that they may bear upon the cans of different sizes at proper points when set in operation, as hereinafter described. In order to further effect the adaptation of the machine to cans of different sizes, the parts of the chute 85 near the end of said trough are also made adjustable, as is shown in detail in Figs. 14, 15, and 16. Referring to those figures, 87 indicates a portion of the framework carried upon the other framework of the machine and, as is shown in said figures, is preferably cylindrical in section. 100 indicates bearings which are mounted upon the frame 87 and secured in position by screws 101. 102 indicates straps which are secured to the bearings 100 by means of screws 103. The straps 102 are provided with elongated slots 104. 105 indicates screws which are screwed into the bottom 106 of the chute 85, passing through the slot 104 and whose heads bear upon the lower surface of the strap 102. By loosening the screws 105 the chute 85 may be moved longitudinally of itself and by tightening the screws locked in the desired position. By the loosening of the screws 101 the side pieces of the chute may be moved toward or away from each other to accommodate cans of different lengths. As shown in Figs. 14 and 16, the arms 86 are provided with elongated slots 107 near the end farthest away from the wheel. 108 indicates set-screws which pass through the slots 107 into the bottom 106 of the chute, by means whereof the arms 86 may be adjusted longitudinally of themselves in the desired position. The arms 86 are always so adjusted that a can resting at the lower end of the chute against the upturned ends of the arms 86 will be centered upon the plate 36 when it comes into operative position to engage the can. The rods 44 and pin 45 are also so adjusted that when the can is received thereon it will be centered upon the plate 36 and of course also with the arm 33, which, as was said above, registers with the plate 36.

The operation of the above-described devices is as follows: The cans 109 are placed in the chute 85, down which they pass by the action of gravity to the lower end of the chute, the end can resting against the upturned portions of the arms 86. The wheel being set in rotation through the driving-pulley 19, as above described, and rotating in the direction of the arrows in Figs. 1 and 2, the rods 44 pass upward between the arms 86 and engage the side of the can, the can resting against the pins 45, and lift the end can out of the chute. The spring-plate 92 by its pressure on the upper surface of the can assists in urging the can forward and pressing it downward, so as to insure its seating on the rods 44 against the pins 45. The spring-plate 93 bearing slightly upon the upper surface of the next can prevents it from being lifted or jarred from position, but bears so lightly that as soon as the end can is lifted the next can passes into position to be seized by the next arm. As the can is lifted, as above described, the roller 41 comes in contact with the inner surface of the cam-track 78. (See Fig. 7, which shows the position of the parts just before the reception of the can and just before the roller 41 contacts with the cam-track 78.) By the operation of this cam-track against the roller 41 the arm 39$^a$ of the ball-crank lever 39 is thrown downward, operating the toggle-joint lever and forcing the plate 36 inward against the can, the washer 58 pressing the end of the can over the usual opening in the end of the can, so as to afford an air-tight cantact. The toggle-joint lever, composed of the arm 39$^b$ and the link 42, assumes the position shown in Fig. 8, where, the pivotal connection between its parts passing the center, the parts are locked firmly in that position until released, as hereinafter described. By the rotation of the wheel the can thus clamped between the plate 36 and the arm 33 is carried around until it enters the trough of water and passes below the surface of the water. As the can is completely submerged the arm 82 contacts the stop 83, (see Fig. 17,) the parts being so arranged and adjusted as to insure this, by which means, as above described, the valve 80 is opened and the compressed air passing from the reservoir 22 through the pipe enters the can. This action takes place just before the can is in the position at the left in Fig. 5. As the wheel rotates a little farther the pin 84, contacting the lower end of the arm 82, closes the valve 80. The can thus filled with compressed air under a suitable pressure passes onward through the water. The floats 49 of course enter the water as the wheel rotates. As will be seen in Fig. 5, the floats are so adjusted that their upper surface slopes upward on entering the water and the air below the float escapes freely through the opening 50, so that the float, as was above described, is not lifted as it enters the water, but remains in its lowest position, its supporting-lever 48 being adjusted as above described, so that the float unless acted upon as hereinafter described will remain in its lower position. If there is no hole in the can through which the compressed air may escape, the float remains in this position throughout the passage of the can through the water, and the end of the lever 48 opposite from the float passes through the recess 57 of the arm 55, so that the arm 55 is not operated. The perfect cans thus held pass onward and leave the water. As the can passes from the water and before it reaches the chute 95 the roller 41 contacts the cam-track 79. Its position just as it contacts that track as it emerges from the water is best shown in Fig. 8. By the bearing of the cam-track 79 upon the roller 41 the arm 39ᵃ of the bell-crank lever is thrown downward into the position shown in Fig. 9, and, operating the toggle-joint lever composed of the arm 39ᵇ and the link 42, the plate 36 is drawn away from the can, which being free to pass out rolls off the rods 44, its doing so being insured by the rod 96, and rolls into the chute 95, down which it passes to be collected with other perfect cans.

In case there is an opening in the can the compressed air in the can when it enters the water will begin to escape, as is indicated in Fig. 5, and being directed by the deflectors 46 passes upward through the opening 47 in said deflectors under the float 49. When the float, passing onward, assumes a position in which its upper surface inclines upward at its forward end as it travels, the air ceases to escape through the opening 50 and causes the float to rise. As the float rises the hook 58, swinging by the action of gravity, swings under the lever 48, locking the end containing the float in its raised position. The other end of the lever 48 being lowered by the end on which the float is mounted does not pass through the recess 57 of the arm 55 as the wheel rotates, but, being in the position shown in dotted lines in Fig. 6, contacts the arm 55 and, raising it, opens the valve 53, permitting the discharge of the compressed air from the reservoir 22 through the piping 52 into the cylinder 63 above the piston 64. As soon as the lever 48 disengages the arm 55 the arm 55 by its own weight drops back into its normal position against the stop 55, closing the valve 53. When the compressed air by the opening of the valve 53 is admitted above the piston-head 64, the piston is forced downward, as above described, moving the sliding bar 74 to the right in Fig. 10.

The parts being so adjusted that the roller 41 at this moment comes opposite the plate 75, the plate 75 by its movement bears against said roller and, moving it to the right in Fig. 13, operates the bell-crank lever 39, so as to throw its end outward into the same position that the parts assume when the roller 41 contacts the cam-track 79 in the case of a perfect can—that is to say, it operates the toggle-joint lever so as to draw the plate 36 back and release the imperfect can, which being prevented from rolling out too soon by the rods 98 drops out of position into the chute 97 and rolls down the same to be disposed of in any suitable manner. It is obvious, of course, that the number of spokes and their accompanying devices may be varied at pleasure, so that the wheel may receive and carry around any desired number of cans at a time. The chute 85 will of course be understood as kept full of cans, so as to supply the wheel as it rotates, and, as said above, they are successively taken from the chute and perfect cans delivered separately into one chute and the leaky cans into another, thus insuring the automatic separation of imperfect and leaky cans from the perfect ones.

I have shown in the drawings and described above the form of mechanism in which I prefer to embody my invention. It is obvious, however, that the form of the devices might be changed in many respects without departing from the essence of my invention. For instance, instead of a wheel some other suitable form of carrier might be used. It is also obvious that the form of the float and the accompanying mechanism operated thereby to discharge defective cans might be considerably varied without departing from the spirit of my invention in this respect, which, as said above, consists in its essence of means operated by air escaping from a leaky can to discharge such can from the carrier, and while the best embodiment of my invention consists in the use of a device in the nature of a float operated by the air escaping from a leaky can to discharge such can from the wheel or other carrier my invention is not restricted to the use of a float, but includes any other device operated by the air escaping from a leaky can to discharge such can.

That which I claim as my invention, and desire to secure by Letters Patent, is—

1. In a can-testing machine, adapted to engage and carry a can, the combination with a float adapted to be moved from its normal position by air escaping from a leaky can, of mechanism operated by said float, when so moved from its normal position, to discharge the can, substantially as described.

2. In a can-testing machine, the combination with a water-tank, a can engaging and carrying mechanism adapted to automatically engage a can and carry the same into said tank, of a float adapted to be moved from its normal position by air escaping from a leaky can, and mechanism operated by said float when so moved from its normal position to discharge a can from said can engaging and carrying mechanism, substantially as described.

3. The combination with a water-tank, mechanism adapted to engage a can and carry it through said water-tank, and means for filling said can with air under pressure, of a float carried by said can engaging and carrying mechanism and adapted to be moved from its normal position by air escaping from a leaky can, and mechanism operated by said float when so moved from its normal position to discharge a can from said can engaging and carrying mechanism, substantially as described.

4. The combination with a water-tank, mechanism adapted to engage a can and carry it through said water-tank, and means for filling said can with air under pressure, of a float carried by said can engaging and carrying mechanism and adapted to be moved from its normal position by air escaping from a leaky can, mechanism operated by said float when so moved from its normal position to discharge a can from said can engaging and carrying mechanism, and other mechanism adapted to discharge a can from said can engaging and carrying mechanism when said float is not moved from its normal position, substantially as described.

5. The combination with a water-tank, mechanism adapted to engage a can and carry it through said water-tank, and means for filling said can with air under pressure, of a float carried by said can engaging and carrying mechanism and adapted to be moved from its normal position by air escaping from a leaky can, a receptacle adapted to receive defective cans, and mechanism operated by said float when raised from its normal position to discharge a defective can to said receptacle, substantially as described.

6. The combination with a water-tank, mechanism adapted to engage a can and carry it through said water-tank, and means for filling said can with air under pressure, of a float carried by said can engaging and carrying mechanism and adapted to be moved from its normal position by air escaping from a leaky can, a receptacle adapted to receive defective cans, mechanism operated by said float when raised from its normal position to discharge a defective can to said receptacle, a second receptacle adapted to receive perfect cans, and mechanism operated by said can-carrying mechanism when said float is not raised from its normal position to discharge perfect cans to said second receptacle, substantially as described.

7. In a can-testing machine, the combination with a water-tank, a wheel, can engaging and carrying mechanism carried by said wheel and adapted, by the rotation of said wheel, to each automatically engage a can and carry the same into and through said water-tank, and mechanism operated by said wheel and adapted to fill a can, so engaged and carried, with compressed air, of floats carried by said wheel and adapted to be moved from their normal position by air escaping thereto from a leaky can, and mechanism operated by said floats when so moved from their normal position to discharge a can from said can engaging and carrying devices, substantially as described.

8. In a can-testing machine, the combination with a water-tank, a wheel, can engaging and carrying mechanisms carried by said wheel and adapted, by the rotation of said wheel, to each automatically engage a can and carry the same into and through said water-tank, and mechanism operated by said wheel and adapted to fill a can, so engaged and carried, with compressed air, of floats carried by said wheel and adapted to be moved from their normal position by air escaping thereto from a leaky can, mechanism operated by said floats when so moved from their normal position to discharge a can from said can engaging and carrying devices, and mechanism operated by the rotation of said wheel to automatically and separately discharge perfect cans from said can-engaging mechanism when said floats are not so moved from their normal position, substantially as described.

9. In a can-testing machine, the combination with a reservoir adapted to contain compressed air, a water-tank, can engaging and carrying mechanism adapted to automatically engage cans and carry the same through said water-tank, connections between said air-reservoir and said can engaging and carrying mechanism, mechanism adapted to automatically open and close said connections between said reservoir and can-carrying mechanism, whereby the can will be filled with compressed air while passing through said water-tank, of a float mounted in proximity to said can engaging and carrying mechanism and adapted in its passage through the water to be moved from its normal position by air escaping from a leaky can, a lever connected with said float and adapted to be moved by the movement of said float, a cylinder, a pipe connecting said cylinder with said reservoir, a valve mounted in said pipe and adapted to be operated by said lever, when said float is moved from its normal position as aforesaid, to temporarily open the connection between said air-reservoir and said cylinder, a piston in said cylinder, devices operated by said piston to disengage a leaky can from said can engaging and carrying mechanism, and mechanism operated by said can engaging and carrying mechanism to separately discharge perfect cans, substantially as described.

10. In a can-testing machine, the combination with a reservoir adapted to contain compressed air, a water-tank, can engaging and carrying mechanism adapted to automatically engage cans and carry the same through said water-tank, connections between said air-reservoir and said can engaging and carrying mechanism, mechanism adapted to automatically open and close the connections between said reservoir and said can-carrying mechanism, whereby the can will be filled with compressed air while passing through said water-tank, of a float mounted in proximity to said can engaging and carrying mechanism and adapted in its passage through the water to be moved from its normal position by air escaping from a leaky can, a deflector adapted to direct air escaping from a leaky can to said float, a lever connected with said float and adapted to be moved by the movement of said float, a cylinder, a pipe connecting said cylinder with said reservoir, a valve mounted in said pipe and adapted to be operated by said lever, when said float is moved from its normal position as aforesaid, to temporarily open the connection between said air-reservoir and said cylinder, a piston in said cylinder, devices operated by said piston to disengage a leaky can from said can engaging and carrying mechanism, and mechanism operated by said can engaging and carrying mechanism to separately discharge perfect cans, substantially as described.

11. In a can-testing machine, the combination of a wheel, supports mounted on said wheel, an arm carried upon each of said supports, a plate mounted on each of said supports and adapted to move toward and from said arm, toggle-joint levers carried on said wheel, a cam-track adapted to engage said toggle-joint levers, when said wheel is rotated, and move said plate toward said arm to engage a can between said plate and said arm, and a second cam-track adapted, when said wheel is rotated, to engage said toggle-joint levers and move said plate away from said arm to discharge a can, substantially as described.

12. In a can-testing machine, the combination with a wheel, devices carried by said wheel and adapted to engage and carry a can and afterward discharge the same, of pins adjustably mounted on said wheel and adapted by their adjustment to center cans of different sizes upon said can-engaging mechanism, a chute adapted to lead cans toward said wheel, and arms at the lower ends of said chute, said arms being bent upward at their ends nearest to the wheel to retain a can until lifted out by said can-engaging devices, and being adjustable longitudinally of said chute to cans of different diameters, substantially as described.

13. A can-testing machine, consisting of a carrier, and means operated by air escaping from a leaky can to discharge such can from said carrier, substantially as described.

14. A can-testing machine, consisting of a water-tank, a carrier adapted to submerge cans in the water in said tank, and means operated by air escaping from a leaky can to discharge such can from said carrier, substantially as described.

15. A can-testing machine, consisting of a water-tank, a carrier adapted to submerge cans in the water in said tank, means for charging the cans with compressed air, and means operated by air escaping from a leaky can to discharge such can from said carrier, substantially as described.

GEORGE F. LEIGER.

Witnesses:
HELEN M. COLLIN,
JULIA M. BRISTOL.